United States Patent [19]

Kaku et al.

[11] 4,333,105
[45] Jun. 1, 1982

[54] BEAM-INDEXING COLOR TELEVISION RECEIVER

[75] Inventors: Masaro Kaku, Ebina; Kunio Ando, Yokohama; Toyota Honda, Yokohama; Fumio Inoue, Yokohama, all of Japan

[73] Assignee: Hitachi, Ltd., Tokyo, Japan

[21] Appl. No.: 179,895

[22] Filed: Aug. 20, 1980

[30] Foreign Application Priority Data

Aug. 22, 1979 [JP] Japan .............................. 54-106077
Apr. 23, 1980 [JP] Japan .............................. 55-52955

[51] Int. Cl.$^3$ .............................................. H04N 9/24
[52] U.S. Cl. .................................................. 358/67
[58] Field of Search ........................ 358/67, 68, 69, 70

[56] References Cited

U.S. PATENT DOCUMENTS 4,232,332 11/1980 Toyama .............................. 358/67

FOREIGN PATENT DOCUMENTS 52-39315  3/1977 Japan .............................. 358/67
52-54328  5/1977 Japan .............................. 358/67
54-139335 10/1979 Japan .............................. 358/67

*Primary Examiner*—Michael A. Masinick
*Attorney, Agent, or Firm*—Craig & Antonelli

[57] ABSTRACT

A beam-indexing color television receiver having a phosphor screen including one index stripe for every predetermined integral number of phosphor stripe sets each including a red, a green and a blue phosphor stripe. The minimum bias current is supplied to the picture tube only upon detection of a chrominance signal within a predetermined hue range around a specific chrominance signal corresponding to the phosphor stripe which is in the middle between adjacent index stripes on the phosphor screen, thus attaining a superior color saturation and contrast.

8 Claims, 8 Drawing Figures

BEAM-INDEXING COLOR TELEVISION RECEIVER

BACKGROUND OF THE INVENTION

1. Field of the Invention

The present invention relates to a color television receiver, or more in particular to a beam-indexing color television receiver with an improved color reproducibility.

A beam-indexing color television receiver comprises a picture tube including a phosphor screen having phosphor stripes illuminated in red (R), green (G) and blue (B) by irradiation thereon of an electron beam and index phosphor stripes aligned in a predetermined position relative to the alignment of the phosphor stripes for emitting invisible light such as ultraviolet rays by irradiation thereon of an electron beam. An index signal obtained when an electron beam scans the index phosphor stripes is used to detect the electron beam scanning position, and on the basis of the resulting data the amount of electron beams is modulated by time so that the desired ones of the R, G and B phosphors are illuminated to the desired brightness, thus reproducing a color image of normal hue as well known.

The beam-indexing color television receiver is generally classified into the two types mentioned below according to the relative arrangement of sets (hereinafter referred to as triplets) of R, G and B phosphor stripes and the index phosphor stripes.

One of them, which is called the l/m type, is so configured that one index phosphor stripe is assigned to every m (integer) triplets. In the other type which is called the n/m type, n index phosphor stripes (m and n being integers which have no common measure) are assigned to every m triplets.

2. Description of the Prior Art

The n/m type has the advantage that substantially the same index signal is always obtained regardless of the hue reproduced on the screen of the receiver thereby to attain a uniform color reproducibility for each color, but the disadvantage thereof is that a start synchronizing means is required, resulting in various incidental shortcomings as well known. Specifically, the shortcomings include the facts that a start synchronizing index phosphor stripe is required, thereby reducing the effective screen size proportionally, that the configuration of the start sync signal processing circuit is complicated, that in a case of malfunction of the start sync signal processing circuit by noises mixing therein or other causes, the hue of the whole of a scanning line is completely disturbed, often leading to an abnormal image on the screen, and that in a case where a signal of low brightness level is included in a scanning line and the index signal is not obtained for that particular part, the hue of the reproduced color is disturbed for the remaining part of the scanning line. In order to solve this problem in the prior art, a beam current of 1 to 2 $\mu A$, that is, a minimum required bias current is applied to the beam-indexing picture tube at all times, thereby stably detecting the index signal over the whole effective screen area. This method, however, gives rise to another disadvantage that as the bias current is applied to the beam-indexing picture tube all the time, the black level of the reproduced image (for example, the uncolored black part of hair) will not be reduced sufficiently, so that neither a sufficient contrast nor a sufficient color saturation is attained.

The greatest advantage of the l/m type, on the other hand, is that the start sync means is not required as well known. Although this eliminates the shortcoming of the n/m type, there are such disadvantages that the index signal is not produced at the time of reproduction of a specific color and that the index signal obtained by electron beam scanning involves a different phase error in each of the different reproduced colors, as described in detail later. The last-mentioned disadvantage is a phenomenon that the hue of the reproduced image is slightly deviated from the hue information of the received signal.

First, the disadvantage that the index signal is not obtained at the time of a specific color reproduction will be described in detail. FIG. 1 shows a sectional view of a phosphor screen of a beam-indexing color television picture tube (hereinafter referred to as a picture tube) of the l/l type having an index phosphor stripe for each triplet. Reference numeral 1 denotes a panel glass, on which a red, a green and a blue phosphor stripe designated by R, G and B respectively are coated. The shadowed portion 2 denotes a guard-band disposed between adjacent phosphor stripes. Numeral 3 denotes a metal back, and numeral 4 an index phosphor stripe, which is located between the R and G phosphor stripes in the drawing under consideration. The beam current waveforms for reproducing red, green and blue colors by use of this picture tube are shown by solid lines in FIGS. 2(a), 2(b) and 2(c), respectively. In the figure, a beam current actually flows in the portion higher than the 0 level where the beam current is cut off. The portion of dashed lines under the 0 level shows that the waveform of the voltage for driving the picture tube is a sine wave. In FIG. 2, the shadowed parts show the portions in which an electron beam irradiates the index phosphor stripes 4 of FIG. 1 thus producing an index signal. In a case where red and green shown in FIGS. 2(a) and 2(b) are reproduced on the picture tube screen, an index signal is generated. In a case where the blue color shown in FIG. 2(c) is reproduced, however, no index signal is produced since the electron beam is cut off at the position of the index phosphor stripes 4 as seen from the figure. In a case of the picture tube having the phosphor screen shown in FIG. 1, the specific color for which no index signal is produced is blue. If the relative positions of the index phosphor stripes are different with respect to the triplet arrangement, however, the specific color for which no index signal is produced is naturally different. The case where blue is the specific color for which no index signal is produced will be described below. By the way, it is self-explanatory that in the case of the 1/3 type with one index phosphor stripe assigned to every three triplets, there is a specific color for which no index signal is produced.

When a color saturation is high and the peak current value is large such as in the case of a color bar signal, a large electron beam diameter is involved, with the result that even a slight deviation of focus adjustment will cause the index phosphor stripes to be irradiated by the beam for reproduction of a specific color, thus making the receiver operation unstable.

SUMMARY OF THE INVENTION

Accordingly, it is the object of the present invention to provide a beam-indexing color television receiver which is very low in the reduction of color saturation and contrast and in which a signal processing circuit always operates stably on an index signal obtained for every chrominance signal.

In order to achieve the above-mentioned object, according to the present invention, there is provided a circuit for detecting the presence of a specific chrominance signal within a predetermined hue range around the specific chrominance signal corresponding to the phosphor stripe at a phase position of approximately 180 degrees on the phosphor screen with respect to the index stripe, so that in a case where such a specific chrominance signal is detected, a bias current is supplied to the picture tube thereby to produce an index signal without fail.

According to another aspect of the invention, the above-mentioned means for supplying to the picture tube the bias current further includes means for clipping the black-side level of a beam-index color signal, which clipping means is controlled by the luminance level of a signal having a luminance component while controlling the luminance signal level in accordance with the hue to be reproduced, thus reproducing a satisfactory color image.

DETAILED DESCRIPTION OF THE INVENTION

Figure 1:
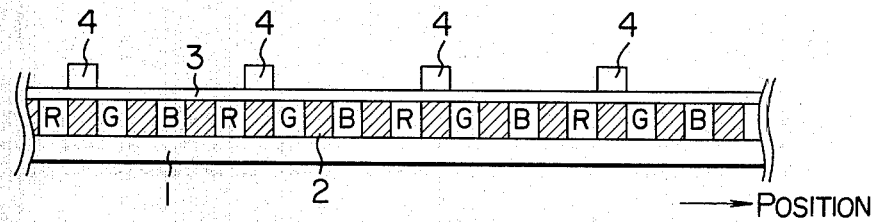
FIG. 1 is a sectional view of the phosphor screen of a beam-indexing color television receiver picture tube of the 1/1 type.

In a beam-indexing color television receiver, the position of an electron beam scanning the phosphor screen of the pictue tube (beam-indexing picture tube) with tricolor phosphor stripes arranged thereon is detected by an index signal obtained when the electron beam scans the index stripes arranged in relative positions with respect to the phosphor stripes. This index signal is fed back to a signal processing circuit of the color television receiver and a color-subcarrier signal is converted into a dot sequential chrominance signal, which signal is in turn applied to the cathode of the picture tube thereby to cause the phosphor stripe of the associated color to emit light. In that case, a sine wave driving system is usually used in which the dot sequential chrominance signal substantially in the form of sine wave is applied to the picture tube. This system is such that the frequency of the color-subcarrier signal (3.58 MHz) is converted into the frequency of the index signal and applied to the cathode of the beam-indexing picture tube, as described in detail in "Principles of Color Television by the Hazeltine Laboratories Staff, 1956, John Wiley and Sons Inc. New York, pp. 433 to 476".

The composite television signal $E_M$ in the NTSC system is given as $$E_M = E_Y + \frac{(E_B - E_Y)}{2.03} \sin 2\pi f_c t \quad (1)$$
$$+ \frac{(E_R - E_Y)}{1.14} \cos 2\pi f_c t$$

where $E_R$, $E_G$ and $E_B$ are primary-color signals of red, green and blue respectively, $E_Y$ the luminance signal ($=0.30 E_R + 0.59 E_G + 0.11 E_B$) and $f_C (\approx 3.58$ MHz) the color-subcarrier frequency. As seen from equation (1) above, the composite television signal is the result of superimposing color-subcarrier signals of the second and third terms upon the luminance signal $E_Y$. The color-subcarrier signal is considered to be a signal including a color-subcarrier signal of zero degree in phase angle which is modulated with the signal $E_B - E_Y$, and a color-subcarrier signal of 90 degrees in delay phase angle which is modulated with the signal $E_R - E_Y$, respectively.

In an ordinary method of demodulating the color-subcarrier signal, a reference signal synchronized by a burst signal is used for synchronous detection of the color-subcarrier signal in a phase corresponding to $E_B - E_Y$ and $E_R - E_Y$ thereby to produce signals $E_B - E_Y$ and $E_R - E_Y$. These signals $E_B - E_Y$, $E_R - E_Y$ and $E_Y$ are processed in a matrix circuit, thus producing chrominance signals $E_R$, $E_G$ and $E_B$.

In a shadow-mask color television receiver, there are provided the exclusively-used electron guns for each of the above chrominance signals $E_R$, $E_G$ and $E_B$, correspondingly and respectively, so that a color picture may be reproduced by applying each of the above chrominance signals to the corresponding electron guns exclusively-used therefor. However, the efficiency of an effectively utilized electron beam is as low as about 20% in the shadow-mask color television receiver, and therefore a single electron gun type color television receiver which does not require any shadow mask, has been considered in order to increase the efficiency of the effectively utilized electron beam.

As noted above, in view of the fact that the amplitude of the color-subcarrier signal is associated with the color saturation and the phase thereof with the hue, a direct demodulation system is available in which the electron beam is modulated by the color-subcarrier signal and sampled by the color phosphor stripes of the screen thereby to reproduce a color picture. However, since the color-subcarrier signal has no correlation with the arrangement of the color phosphor stripes, it is required to produce a signal having such a correlation. For this purpose, the color-subcarrier signal is replaced by a signal of triplet frequency $f_t$ obtained from the index signal. In other words, a color-subcarrier signal having a frequency of the color-subcarrier signal which is converted from 3.58 MHz to $f_t$ is produced without changing the color information.

The color-subcarrier signal thus converted is added to the luminance signal $E_Y$ and supplied to the electron gun of the color picture tube.

One example of color-subcarrier signal converter circuit of the above-mentioned direct demodulation type will be briefly explained below. The color-subcarrier signal converter circuit comprises three mixer circuits. In the first mixer circuit, an index signal $e_1 = \cos 2\pi f_t \cdot t$ of frequency $f_t$ obtained by scanning an electron beam on the phosphor surface and a reference subcarrier signal $e_s = \cos 2\pi f_c t$ synchronized with a burst signal are mixed, thereby producing a signal having a frequency equal to the sum of frequencies. The second mixer circuit is supplied with the signal from the first mixer circuit and a color-subcarrier signal $e_c = A\cos(2\pi f_c t + \theta)$ of amplitude A and phase angle $\theta$, thereby producing a signal having a frequency equal to the difference of those frequencies. The third mixer circuit is constituted such that in response to an index signal $e_2 = \cos 2\pi 2f_i t$ of frequency $2f_i$ and the output signal of the second mixer circuit, a signal of the difference frequency is produced so that the carrier $f_c$ may be converted into $f_i$ thereby to produce a beam-index color signal of $A \cos(2\pi f_i t + \theta)$, so that a color picture may be reproduced by applying the beam-index color signal to a single electron gun picture tube.

However, if the electron beam is cut off completely at the portion of phosphor stripes for producing the index signal, the index signal disappears, and therefore the relationship between the positions of the color phosphor stripes and the index signal becomes unidentified, thus disturbing the color picture. Therefore, as mentioned above, in the prior art, a minimum required electron beam current is held always thereby to prevent the disturbance of the color image.

The present invention provides a circuit configuration in which the bias current is supplied only upon detection of a specific hue signal for which the electron beam is completely cut off thus making it impossible to take out the index signal.

Embodiments of the present invention will be described below with reference to the accompanying drawings.

Figure 3:
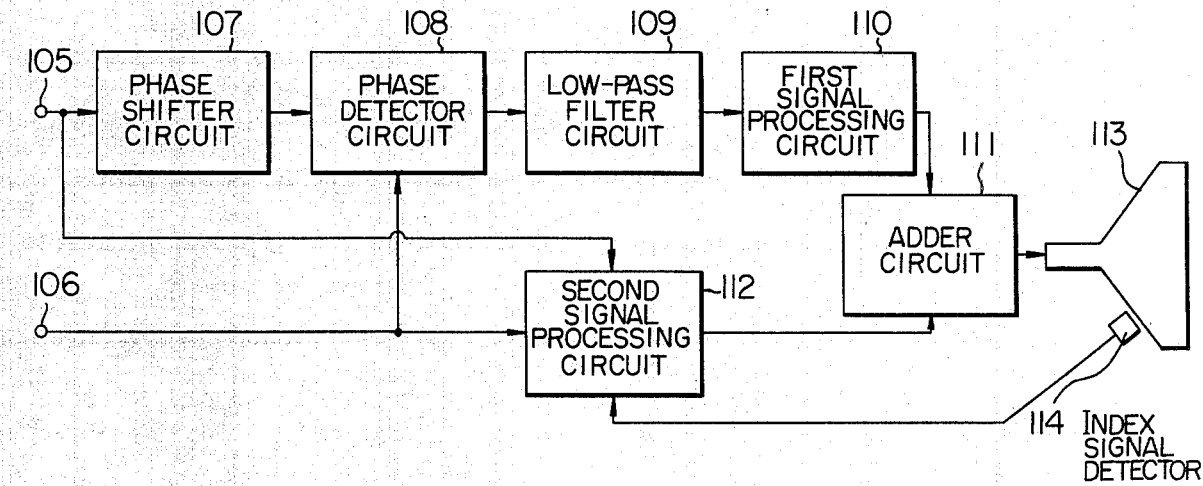
FIG. 3 is a block diagram showing a first embodiment of the present invention.

FIG. 3 is a block diagram showing a first embodiment of the present invention.

Figure 2:
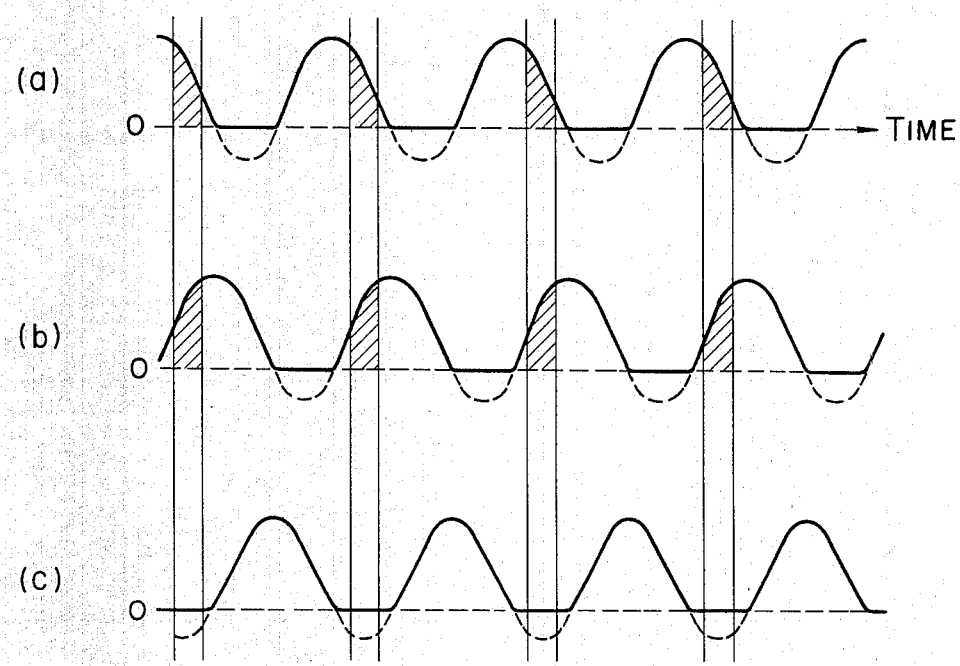
FIG. 2 shows waveforms of a beam current for reproducing red, green and blue colors in the picture tube shown in FIG. 1.
Figure 4A:
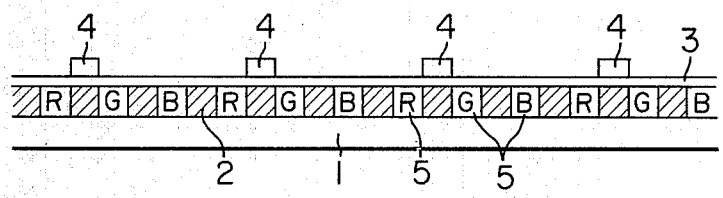
FIGS. 4a and 4b are diagrams showing phosphor screens of the beam-indexing picture tubes of the 1/1 and the 1/3 types, respectively.
Figure 4B:
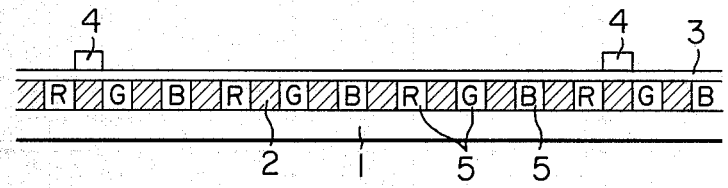

In the drawing, numeral 105 denotes an input terminal for receiving a reference subcarrier generated in the receiver in synchronism with the color burst received, numeral 107 a phase shifter circuit, numeral 108 a phase detector circuit, numeral 109 a low-pass filter circuit, numeral 110 a first signal processing circuit, numeral 111 an adder circuit, numeral 112 a second signal processing circuit, numeral 113 a beam-indexing picture tube, and numeral 114 an index signal detector. In this embodiment, the phosphor screen of the picture tube is of the 1/1 type in which one index stripe is provided for each tricolor phosphor stripe set similar to the system in FIG. 1 having an index stripe between the red and green phosphor stripes. In this configuration, if no action is taken for the blue signal (as explained with reference to FIG. 2(c) corresponding to the blue phosphor stripe at the position corresponding to a phase of about 180 degrees on the phosphor screen with respect to the index stripe, it is impossible to obtain an index signal. Therefore, the embodiment under consideration is so constructed that the bias current is supplied only when a blue component is detected from the color-subcarrier signal received. The signal received at the color-subcarrier input terminal 105 is phase-shifted for reproduction of the blue signal at the phase shifter circuit 107 (which phase is advanced, for example, by about 167 degrees from the color burst), and applied to the phase detector circuit 108. The signal applied to the color-subcarrier signal input terminal 106, on the other hand, is applied to the phase detector circuit 108 the output of which becomes maximum when the phases of the two input signals are equal, namely, when the chrominance signal is blue. The output signal of the phase detector 108 is applied through the low-pass filter circuit 109 to the signal processing circuit 110 (which may take the form of a switching circuit adapted to operate only in response to a signal associated with blue out of the output signals of the low-pass filter circuit 109) thereby to be waveform-shaped, synthesized with the output signal (chrominance signal) of the chrominance signal processing circuit 112 at the adder circuit 111, and applied to the cathode of the beam-index picture tube 113. The operation of the chrominance signal processing circuit 112 is described in detail in the above-cited reference at p. 456, FIGS. 16–12. This configuration may be modified in various ways such as by inserting an amplitude limiting amplifier between the color-subcarrier signal input terminal 106 and the phase detector circuit 108 or by providing the phase shifter circuit 107 between the terminal 106 and the phase detector circuit 108. The embodiment under consideration is the case in which the index stripe is inserted between the red and green phosphor stripes. As an alternative, however, the index stripe may be positioned between a green and a blue phosphor stripe or a blue and a red phosphor stripe with equal effect. In such a case, the phase shifter circuit 107 is set by the phase detector circuit 108 in such a manner as to detect red or green respectively. Our experiments, however, show that it appears that the deterioration of the color saturation is minimum when the bias current of the same value is applied, and therefore in embodying the present invention, the best practical method is to insert the index stripe between the red and green phosphor stripes as shown in FIG. 4a. The index stripe is disposed at the guard-band position between the phosphor strips, i.e. in the same plane as the phosphor stripes. In FIG. 4a, on the other hand, the index stripe 4 is disposed on the inner side of the metal back 3 in order that the electron beam or the ultraviolet ray at the time of excitation of the index stripes by the electron beam need not pass the metal back 3. In FIGS. 4a and 4b, numeral 1 is a panel glass of the picture tube and, numeral 2 a black body inserted between adjacent phosphor stripes which is useful for improving the contrast. FIG. 4b shows the phosphor screen of the 1/3 type having one index stripe for each three sets of phosphor stripes each comprising a red, a green and a blue phosphor stripe. In that case, the index signal produced from the index signal detector 114 in FIG. 3 is applied to the second signal processing circuit 112 through a circuit for multiplying the frequency by three.

As explained above, according to the circuit configuration of the first embodiment of the present invention, the bias current is applied to assure reproduction of a proper color only in a case where it is expected that the index signal can not be detected stably, while the bias current is prevented from being applied to the picture tube in the case of a color for which an index signal is produced by an original image reproduction electron beam, thus preventing the color saturation and contrast from being deteriorated.

Figure 5:
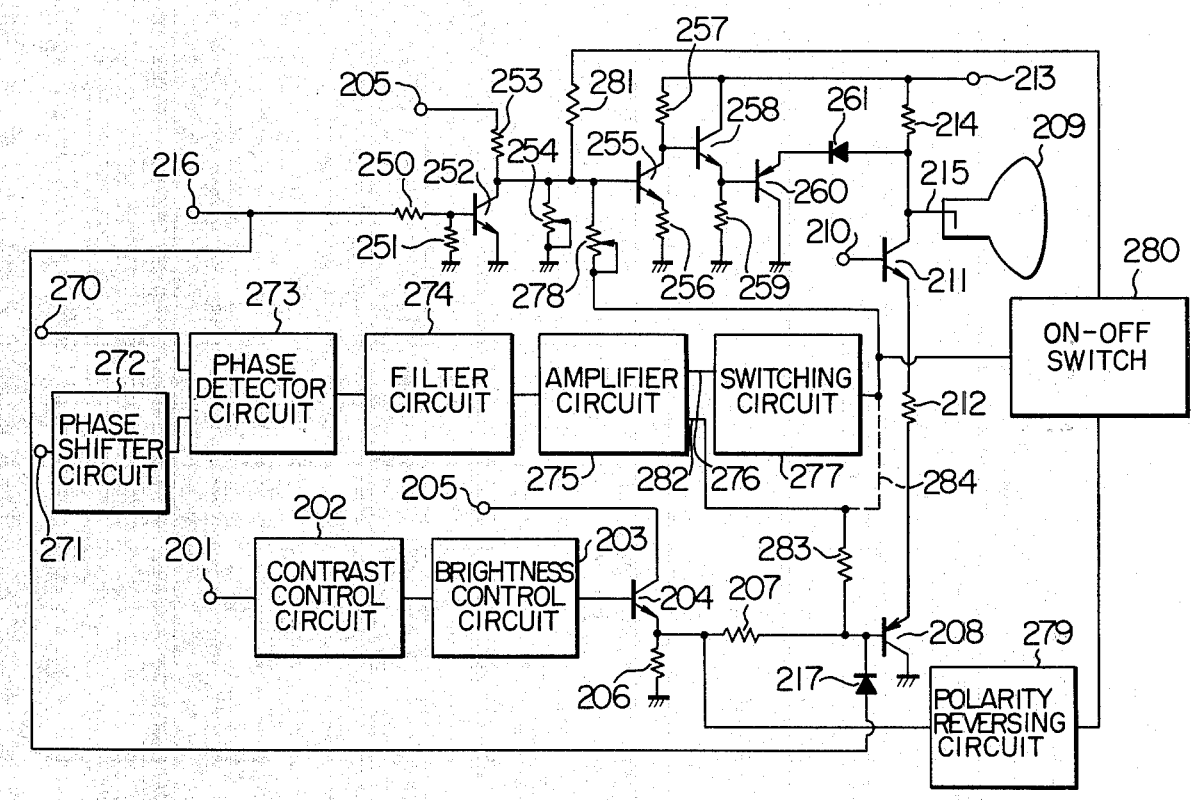
FIG. 5 is a circuit diagram according to a second embodiment of the present invention.

Next, a second embodiment of the present invention will be explained below. FIG. 5 is a circuit diagram for explaining the second embodiment of the present invention. In the case of a color bar signal or the like involving a high color saturation and peak current value, the diameter of the electron beam is so large that even a slight error of focus adjustment causes the beam to irradiate the index phosphor stripes at the time of reproduction of a specific color when the index signal would otherwise be not generated, thus making the receiver operation unstable. Thus, the amplitude of the color signal of the beam-index type is to be limited below a predetermined level.

The second embodiment of the invention will be described more in detail below with reference to the accompanying drawings. FIG. 5 is a circuit diagram showing the second embodiment of the invention. The terminal 201 is supplied with a signal having a luminance component. (In the beam-indexing color television receiver, the signal having a luminance component is called a monochrome signal which corresponds to the luminance signal for the ordinary shadow-mask color television receiver. Substantially a normal reproduced image is obtained if the luminance signal is replaced by a monochrome signal in the beam-indexing color television receiver. The monochrome signal hereinafter may be called the M signal. The signal obtained by mixing the beam-index color signal with the M signal may be called the beam-index color signal. This signal having the luminance component, that is, the M signal is applied to the contrast control circuit 202 and the brightness control circuit 203 where the video amplitude and DC voltage level thereof are converted to the desired values respectively, and then applied to the base of the emitter-follower transistor 204. Numeral 205 denotes a regulated-voltage terminal, and numeral 206 an emitter resistor of the transistor 204. The M signal produced at the emitter of the transistor 204 is transmitted to the PNP transistor 208 through the resistor 207. On the other hand, the beam-index color signal obtained by mixing a color-subcarrier signal containing the information on color saturation and hue with a color burst signal and an index signal produced when the electron beam scans the phosphor screen of the picture tube 209 is applied to the base of the transistor 211 from the terminal 210. The process of producing the beam-index color signal is well known from a number of references and will not be described. A resistor 212 is inserted between the emitters of the transistors 208 and 211, and a resistor 214 is inserted between the collector of the transistor 211 and the power terminal 213. The collector of the transistor 211 is connected to the cathode 215 of the picture tube 209. The terminal 216 is supplied with a blanking pulse, which is applied through the diode 217 to the base of the transistor 208. This configuration is the same as that of the cathode drive matrix circuit of the shadow-mask color television receiver, in which the luminance signal is applied to the terminal 201 and the beam-index color signal to the terminal 210. A signal waveform resulting from superimposing a beam-index color signal component on the brightness component corresponding to the average DC voltage level, as shown by solid line in FIG. 6(a), will appear at the cathode 215 of the picture tube 209. In this drawing, the part $t_1$ to $t_2$ on the abscissa represents a blanking pulse, the part $t_2$ to $t_3$ a signal corresponding to a colorless picture image, the part $t_3$ to $t_4$ corresponding to a signal for reproducing picture image of a certain hue, and the part $t_4$ to $t_5$ corresponding to a signal having the same phase as that of the part $t_3$ to $t_4$, and accordingly the hue of the reproduced image of that part $t_4$ to $t_5$ is the same as that of the part $t_3$ to $t_4$, but the average voltage level is so high that the brightness of the reproduced image is low. The fact that the signal phase undergoes a sudden change in such an interrupted manner as at a time point $t_5$ shows that the hue of the reproduced image of the part $t_5$ to $t_6$ is different from that of the part $t_3$ to $t_5$. Also, the signal phase is interrupted at a time point $t_6$, thereby indicating that the hue of the reproduced image of the part $t_6$ to $t_7$ is different from that of the part $t_5$ to $t_6$.

Figure 6:
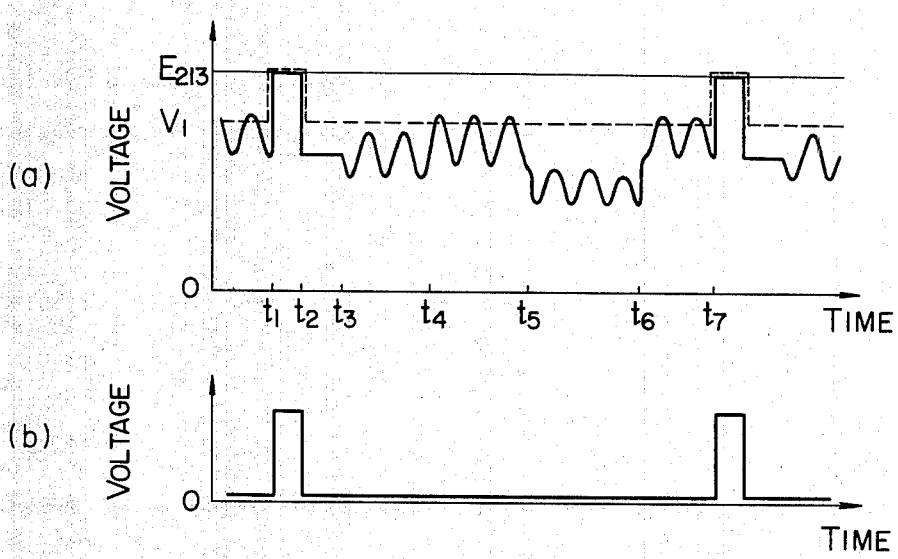
FIGS. 6 and 7 show signal waveforms for explaining the operation of the circuit of FIG. 5.

The essential part of the present invention will be described below. The blanking pulse shown in FIG. 6(b) is applied to the terminal 216 of FIG. 5 and then voltage-divided appropriately by the resistors 250 and 251, thereby to execute switching operation of the transistor 252. A resistor 253 is connected between the collector of the transistor 252 and the terminal 205, and a variable resistor 254 is inserted between the same collector and the grounding terminal. The collector voltage of the transistor 252, therefore, becomes almost equal to ground potential at the time of application of a blanking pulse, but is maintained at a potential which is obtained by dividing the regulated voltage of the terminal 205 by the resistors 253 and 254 during the scanning period. That potential may be set as desired by the variable resistor 254, and then is applied to the base of the transistor 255, reversed in polarity through the emitter resistor 256 and the collector resistor 257 thereof, and after being amplified, is delivered to the emitter of the emitter-follower transistor 258. Numeral 259 denotes an emitter resistor of the transistor 258. The emitter of the transistor 258 is connected to the collector of the transistor 211 through the base-emitter junction of the PNP transistor 260 and the diode 261. The voltage waveform obtained at the emitter of the transistor 258, as shown by dashed line in FIG. 6(a), is the same as the source voltage $E_{213}$ at the terminal 213 during the blanking period, is maintained at a potential as shown by $V_1$ in FIG. 6(a) which is a regulated voltage depending on the resistance value of the variable resistor 254 during the scanning period. The forward base-emitter voltage $V_{BE}$ of the transistor 260 and the forward voltage drop $V_F$ of the diode 261 are negligibly small as compared with the source voltage $E_{213}$ at the terminal 213. Thus, during the period of time when the transistor 260 and the diode 261 are conducting, the voltage shown by dashed line in FIG. 6(a) is directly applied also to the collector of the transistor 211, and also in view of the fact that the impedance on the emitter side of the transistor 260 is low, the collector voltage of the transistor 211 is controlled by the emitter voltage of the transistor 258. In other words, even if there is some part of the beam-index color signal (waveform shown by solid line in FIG. 6(a)) generated by the transistor 208 and 211 which attempts to increase to a level higher than the emitter voltage level (waveform shown by dashed line in FIG. 6(a)) of the emitter of the transistor 258, the particular part is clipped. Therefore, by appropriately setting the emitter voltage level of the transistor 258 during the scanning period, the beam current of the picture tube 209 will never be cut off, thus assuring the required minimum bias current thereof. Also, in view of the fact that as shown in FIG. 5 the black side clipping control signal for the beam-index color signal is produced by use of a blanking pulse, the blanking of the beam current during the blanking period is not interrupted as shown by the dashed line in FIG. 6(a). The diode 261 is for preventing the base-emitter junction of the transistor 260 from being reversely biased and broken in a case where the collector voltage of the transistor 211 is lower than the emitter voltage of the transistor 258 such as during the period from $t_5$ to $t_6$ shown in FIG. 6(a). The same effect is attained by connecting the cathode of the diode 261 directly to the emitter of the transistor 258 instead of using the transistor 260, but the use of the current amplification function of the transistor 260 may attain a more stable clipping effect.

Figure 7:
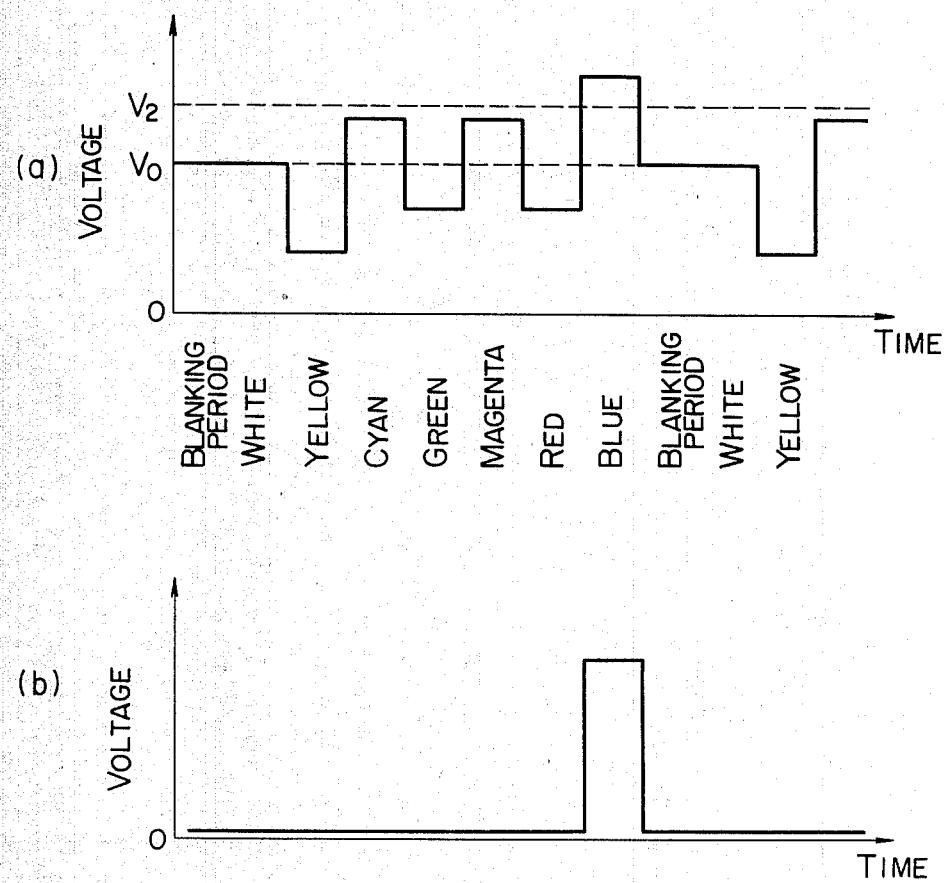

In the embodiment, a color-subcarrier signal (3.58 MHz) having the information on color saturation and hue is applied to the terminal 270 in FIG. 5 and a color burst signal (3.58 MHz) is applied to the terminal 271. The color burst signal is applied through the phase shifter circuit 272 to the phase detector circuit 273 together with the color-subcarrier signal. As the phase shifter circuit, a circuit similar to a hue control circuit used in an ordinary color television receiver or a delay line having the desired length of delay time is used. The phase detector circuit 273 may comprise one NAND gate circuit. A signal of a pulse width corresponding to the phase of the color-subcarrier signal of 3.58 MHz in frequency which is applied to the terminal 270, is produced at the output terminal of the phase detector circuit 273. This signal is applied through a filter circuit 274 including a low-pass filter and a trap thereby to be converted into a DC voltage corresponding to the phase of the color-subcarrier signal. In order to suppress the pulse component of 3.58 MHz in frequency contained in the output signal of the phase detector circuit 273 without adversely affecting the transient characteristics at the time of phase change of the color-subcarrier signal (such as at the time of change from red to blue), the filter circuit 274 is configured to include a low-pass filter for attenuating higher harmonics double, triple or higher than 3.58 MHz and a trap of 3.58 MHz and a double frequency thereof, thus making it possible to produce a desired signal. An example of the output signal of the filter circuit 274 when receiving the color bar signal is shown in FIG. 7(a). In that case, the phase of the color-subcarrier signal is shifted by the phase shifter circuit 272 in such a manner as to produce a maximum voltage for blue. FIG. 7(a) shows the case where the output voltage level of the portion such as the blanking period or white signal in the absence of a color-subcarrier signal becomes an intermediate voltage, which may sometimes be a maximum or a minimum voltage depending on the configuration of the phase detector circuit 273. A specific configuration of the phase detector circuit 273 and the amount of control of the phase shifter circuit 272 is determined in an optimum way taking the whole system into consideration as described later. The output signal of the filter circuit 274, after being controlled in amplitude and DC level by the amplifier 275, is taken out at the output terminal 276 and applied to the switching circuit 277. The switching circuit 277 is so configured as to selectively amplify only the output signal of the filter circuit 274 of FIG. 7(a) to a level higher than the voltage level $V_2$. The switching circuit 277 thus produces a pulse voltage only in response to the blue chrominance signal as shown in FIG. 7(b). To the extent that this output is produced, the component elements from the phase shifter circuit 272 to the switching circuit 277 may be replaced by parts which are different from those in this embodiment. This output shows that a chrominance signal within a predetermined range including blue is received, which predetermined range can be changed by changing the voltage level $V_2$ shown in FIG. 7(b). The switching circuit 277 may alternatively be configured to amplify the signal to a level higher than the voltage level $V_2$ selectively and to produce an output signal proportional to the voltage level higher than the voltage level $V_2$.

The output signal of the switching circuit 277 is applied to the base of the transistor 255 through the variable resistor 278. As a result, only during the receipt of the blue chrominance signal, a pulse voltage is added to the regulated voltage generated during the scanning period by the transistor 252, the resistor 253 and the variable resistor 254, so that the clipping level of the drive voltage of the cathode of the picture tube 209 is reduced below the level of the other chrominance signals only during receipt of the blue chrominance signal, thus controlling the electron beam so as to be more hardly cut off. During receipt of the chrominance signals for which no pulse voltage is produced from the switching circuit 277, the clipping level of the drive voltage of the cathode 215 becomes higher than the beam cut-off voltage level of the picture tube 209, and at the same time, during receipt of the blue chrominance signal, the picture tube 209 involves a voltage of a level immediately before cut-off by appropriate setting of each level, so that the contrast of the reproduced image other than that of the blue chrominance signal is sufficiently improved while producing an index signal without fail also at the time of receipt of the blue chrominance signal. In the n/m type, a sufficient amount of minimum current is required to be supplied over to the whole effective screen area. According to the present invention, on the other hand, the color saturation and the contrast of the reproduced image are of course improved remarkably free of any of the above-mentioned disadvantages of the n/m type. In the embodiment shown in FIG. 5, the clipping means is provided at the cathode 215 of the picture tube 209, instead of which the black level of the beam-index color signal applied to the terminal 210 may be clipped with equal effect.

Although a satisfactory result has been obtained by mounting the above-mentioned means in the beam-indexing color television receiver after studying the quality of various received images, it has been found that using the means mentioned below together with the above-mentioned means results in a more satisfactory image quality. An ordinary received image contains not only the hue information but also the information on the color saturation and brightness. If the clipping level is the same for reproduction of bright blue and dark blue, therefore, the deterioration of the color saturation at the time of reproduction of dark blue is conspicuous. In order to overcome this problem, the clipping level of the voltage at the cathode of the picture tube is reduced for reproduction of bright blue and increased for reproduction of dark blue. For this purpose, in the embodiment of FIG. 5, the brightness level data is taken out of the emitter of the transistor 204 and applied to the base of the transistor 255 through the polarity reversing circuit 279, the on-off switch 280 and the resistor 281. The higher the emitter voltage level of the transistor 204 becomes, the lower the brightness level of the reproduced image is. Since the polarity reversing circuit 279 is inserted, however, the base of the transistor 255 is so controlled as to lower the voltage level thereof in response to a low brightness level, with the result that the collector voltage of the transistor 255 increases and then the clipping voltage at the cathode of the picture tube increases, thus preventing the color saturation from being remarkably deteriorated at the time of reproduction of dark blue. In other words, the awkwardness or the lack of naturality of the image quality is reduced at the time of reproduction of low-brightness blue which is observed only when the same clipping level is used. The circuit of FIG. 5 includes the on-off switch 280 having the input and output terminals thereof which are shorted only at the time of receipt of the blue chrominance signal in response to the output of the switching circuit 277. In view of the fact that the resistor 278 is inserted for control to reduce the clipping voltage level upon receipt of the blue chrominance signal as mentioned above, however, the on-off switch 280 may be always kept shorted to control the clipping voltage level by the brightness level without regard to the hue of the received signal. At the time of reproduction of bright blue, the voltage level of the cathode 215 of the picture tube 209 is reduced, so that even if the clipping level at the picture tube cathode 215 is reduced by control through the resistor 281, the color saturation is not substantially deteriorated.

Figure 8:
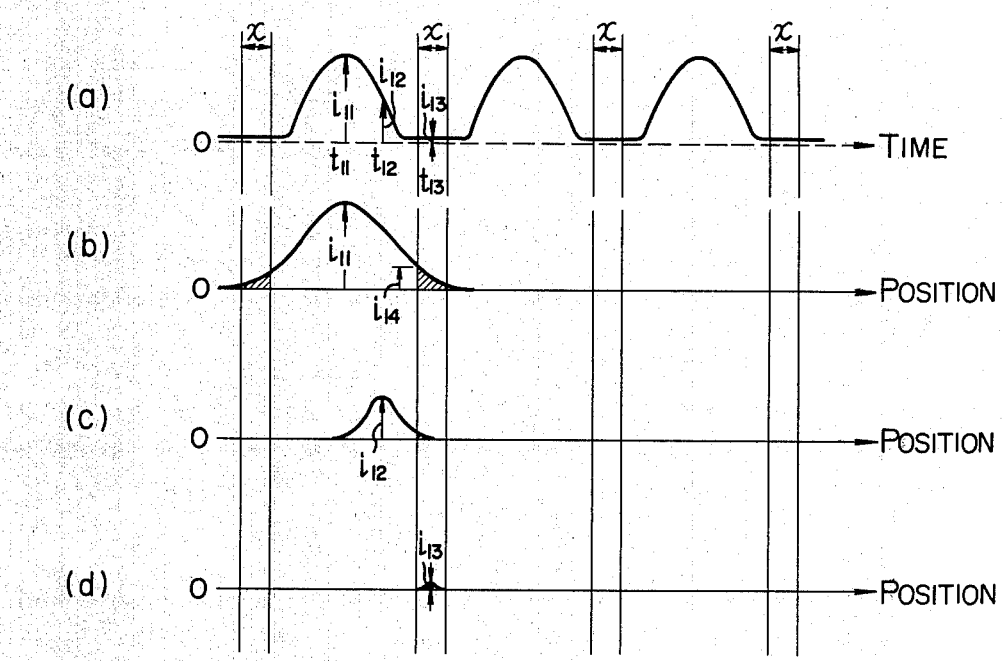
FIG. 8 is a diagram for explaining the unstable operation caused by an excessively large electron beam diameter.

By using together both of the above-mentioned means, the optimum clipping control in accordance with the blue brightness level reproduced on the screen is made possible, thus attaining a substantially satisfactory result of the image quality evaluation on the beam-indexing color television receiver. Even if the above-mentioned means are used in combination, however, the reproduced color stability is not sufficiently high for blue in the case of receipt of a color bar signal or the like very large in chrominance signal amplitude. Specifically, the proper range of focus regulation enabling stable blue reproduction is so narrow that even a slight deviation from optimum focus regulation range makes impossible stable blue reproduction. The beam current waveform and index signal generation for reproduction of each color was described above with reference to FIG. 2, without taking into consideration the diameter of the electron beam. Actually, however, the diameter of the electron beam increases with the beam current value, so that a light index signal proportional to the area of irradiation by the electron beam on the index phosphor materials is produced, which light index signal is subjected to photo-electric conversion, and through such processes as waveform shaping, is used to form a beam-index color signal. With reference to FIG. 8(a), the light index signal will be described for the electron beam having a finite diameter. FIG. 8(a) corresponds to the beam current waveform for blue reproduction, and an index phosphor stripe is provided at parts (four parts) marked with x. The abscissa of this graph represents time including a time point $t_{11}$ at which the center of the electron beam scans the center of the blue phosphor stripe, a time point $t_{13}$ when the index phosphor stripe is scanned, and a time point $t_{12}$ when the portion between $t_{11}$ and $t_{13}$ (immediately before the red phosphor stripe in the case of the phosphor screen shown in FIG. 1) is scanned, reference characters $i_{11}$, $i_{13}$ and $i_{12}$ respectively showing maximum current values (exactly, maximum current density) at each time point. Character $i_{13}$ shows a bias current for the electron beam scanning the index phosphor stripe. FIG. 8(b) shows a form of electron beam at time point $t_{11}$, in which the abscissa represents the position on the phosphor screen. With the deterioration of the focus adjustment, the beam diameter is increased, so that the index phosphor stripe is undesirably irradiated by the "skirt" of the electron beam marked with the current value $i_{14}$ even at time point $t_{11}$. The amount of light index signal generated at time point $t_{11}$ is proportional to the area of the shadowed part in FIG. 8(b). FIG. 8(c) shows the form of the electron beam at time point $t_{12}$, when the beam current value $i_{12}$ is smaller than the beam current value $i_{11}$ at time point $t_{11}$ and so is the electron beam diameter generally. FIG. 8(d) shows the form of the electron beam at time point $t_{13}$. Also in the case of FIGS. 8(c) and 8(d), the light index signal of the amount proportional to the area of the shadowed part in the drawings is generated by irradiation of the electron beam on the index phosphor stripes. As obvious from FIGS. 8(b), 8(c), and 8(d), the amount of the light index signal generated is larger at the time point $t_{11}$ than at the time point $t_{13}$ when the particular signal is to be generated. As a result, normal color reproduction is impossible. In FIG. 8, the increase in the electron beam diameter is exaggerated by way of explanation. In the case of a color bar signal or the like high in color saturation and large in peak current value of the blue signal, however, the electron beam diameter is increased accordingly, so that even a slight deviation of the focus adjustment adversely affects the stability of blue reproduction. For complete solution of this problem, the electron beam diameter of the picture tube should be reduced, in which case the circuits are required to be reconstructed in view of the technical problem encountered in the manufacture of picture tube electron guns and the phenomenon that the amount of light emission of the phosphor stripes due to the irradiation of the electron beam is saturated with the increase in beam current density. First means to be added for such a circuit reconstruction is for increasing the bias current value $i_{13}$ in FIG. 8 beyond the value $i_{14}$ at the skirt or tail of the blue light-emitting beam. This means is easily realized by reducing the value of the variable resistor 278, but resorting to this means alone will lead to an excessive reduction in color saturation for blue reproduction. Second means to be added is for reducing the peak current $i_{11}$ in FIG. 8. For this purpose, in the embodiment of FIG. 5, a control voltage is applied from the other output terminal 282 of the amplifier 275 to the base of the transistor 208 through the resistor 283. The voltage waveform at the output terminal 282 at the time of receipt of the color bar signal is similar to the voltage waveform shown in FIG. 7(a), and increases in voltage level at the time of blue reproduction. Therefore, the brightness for blue reproduction is slightly reduced as compared with the case lacking this control, so that the value of peak current $i_{11}$ in FIG. 8 decreases and then the beam diameter decreases thus improving the stability for blue reproduction. This control is not required if the stability of blue reproduction has a sufficient margin at the time of receipt of the color bar signal or the like, and the amount of control, if any, may be limited to such an extent that stable blue reproduction is possible within the variation of focus adjustment taking into consideration changes with time. Generally, a very small control is sufficient with an increased value of the resistor 283. Further, if such a control is effected with the screen so constructed that a specific color for which no index signal is produced is the blue lowest in sensitivity to vision, the awkwardness does not substantially occur by evaluation of the image quality of the reproduced picture. The output signal at the output terminal 282 includes, as shown in FIG. 7(a), not only control voltages for blue but other colors. The object of this control voltage is stable reproduction of blue, and therefore the control may alternatively be effected through the route shown by dashed line from the output terminal of the switching circuit 277. Third means to be added, though not shown in FIG. 5, is for limiting the amplitude of the blue signal within a predetermined range. Specifically, a maximum amplitude limiting circuit is provided to prevent the amplitude of the beam-index color signal applied to the terminal 210 from increasing beyond a predetermined level. Actual means for this purpose includes means for clipping the peak portion when the amplitude of the chrominance signal exceeds a predetermined value or means for detecting the amplitude of the chrominance signal and controlling the amplification degree of the chrominance signal amplifier circuit by the amplitude information thus detected. These means are realized by use of the well-known techniques of electronic circuits. In order to limit the amplitude of the blue signal alone, the above-mentioned well-known electronic circuit techniques are used in combination with the output signal of the switching circuit 277, namely, the signal shown in FIG. 7(b). If a sufficient effect is attained only by selecting a control level to such an extent as to control part of the amplitude of a color signal such as a color bar signal having a large amplitude, the deterioration of image quality does not substantially occur in the ordinary broadcast signal even when the amplitude of not only the blue but also the beam-index color signals of all hues is limited below a predetermined level. If the third means for limiting the color signal having the amplitude more than a predetermined level is used together with the second means for controlling the luminance or brightness level of the M signal for determining the brightness of the reproduced image in accordance with the hue of the received signal, the lack of naturalness of the reproduced image is further reduced, thus producing an exactly normal index signal even at the time of receipt of the blue signal.

As described above, according to the present invention, the disadvantage of the impossibility of producing an index signal at the time of reproduction of a specific color in the beam-indexing color television receiver of l/m type superior in stability of color synchronization in principle is obviated, so that an accurate index signal is always produced, thus producing an image of a quality as high as the shadow-mask color television receiver. As compared with the shadow-mask color television receiver, the beam-indexing color television receiver is capable of being improved in the utilization rate of electron beams, thereby leading to the advantage that power consumption is reduced, and that the shadow mask is not required of the picture tube and only one electron gun is required, resulting in a simple construction and hence a low cost.

We claim:

1. A beam-indexing color television receiver including a picture tube having a phosphor screen provided with one index stripe for every predetermined integral number of phosphor stripe sets, each of said sets including a red, a green and a blue phosphor stripe, said color television receiver further comprising circuit means for supplying a bias current to said picture tube only upon detection of a chrominance signal within a predetermined hue range around a specific chrominance signal corresponding to the phosphor stripe disposed in the middle between said index stripes.

2. An beam-indexing color television receiver according to claim 1, wherein said chrominance signal is a blue signal.

3. A beam-indexing color television receiver according to claim 1, wherein said circuit means comprises:

(a) a first input terminal for receiving a reference subcarrier generated in the receiver in synchronism with the color burst signal received;
(b) a second input terminal for receiving a color-subcarrier signal;
(c) a phase shifter circuit connected with said first input terminal for shifting the phase of said reference subcarrier;
(d) a detector circuit connected to said second input terminal and said phase shifter circuit for executing phase detection of said color-subcarrier signal;
(e) a low-pass filter circuit connected to said detector circuit for filtering the output of said detector circuit;
(f) a first signal processing circuit connected to said low-pass filter circuit and adapted to be actuated only in response to a signal corresponding to the blue component of the output signal of said low-pass filter circuit;
(g) a signal detector for detecting an index signal;
(h) a second signal processing circuit connected to said second input terminal, said first input terminal and said signal detector for generating a beam-index color signal; and
(i) an adder circuit connected to said first and second signal processing circuits and said picture tube for adding the outputs of said first and second signal processing circuits and applying a bias current to said picture tube.

4. An beam-indexing color television receiver according to claim 3, further comprising a polarity reversing circuit connected to said second signal processing circuit for reversing the polarity of the output of said signal processing circuit, an on-off switch connected to said first signal processing circuit and said polarity reversing circuit for transferring the output of said polarity reversing circuit in response to the output of said first signal processing circuit, and a clipping circuit connected to said first signal processing circuit, said adder circuit and said on-off switch for clipping the output of said first signal processing circuit at a predetermined level on black side of a video signal in response to only an output of said on-off switch in a manner to assure the required minimum bias current of said picture tube.

5. A beam-indexing color television receiver including a picture tube having a phosphor screen provided with one index stripe between red and green phosphor stripes for every predetermined integral number of phosphor stripe sets each including a red, a green and a blue phosphor stripe, said color television receiver further comprising:

(a) a first input terminal for receiving a reference subcarrier generated in the receiver in synchronism with the color burst signal received,
(b) a second input terminal for receiving a color-subcarrier signal;
(c) a phase shifter circuit connected to said first input terminal for shifting the phase of said reference subcarrier;
(d) a detector circuit connected to said second input terminal and said phase shifter circuit for detecting the phase of said color-subcarrier signal;
(e) a low-pass filter circuit connected to said detector circuit for filtering the output of said detector circuit;
(f) a first signal processing circuit connected to said low-pass filter circuit and adapted to be actuated in response to only a signal corresponding to the blue component of the output signal of said filter circuit;

(g) a signal detector for detecting an index signal;

(h) a second signal processing circuit connected to said second input terminal, said first input terminal and said signal detector for generating a beam-index color signal; and (i) an adder circuit connected to said first and second signal processing circuits and said picture tube for adding the outputs of said first and second signal processing circuits, and applying a bias current to said picture tube.

6. A beam-indexing color television receiver including a picture tube having a phosphor screen provided with one index stripe between red and green phosphor stripes for every predetermined integral number of phosphor stripe sets each including a red, a green and a blue phosphor stripe, said color television receiver further comprising:

(a) a first input terminal for receiving a reference subcarrier generated in the receiver in synchronism with the color burst signal received;

(b) a second terminal for receiving a color-subcarrier signal;

(c) a phase shifter circuit connected to said first input terminal for shifting the phase of said reference subcarrier;

(d) a detector circuit connected to said second input terminal and said phase shifter circuit for detecting the phase of said color-subcarrier signal;

(e) a low-pass filter circuit connected to said detector circuit for filtering the output of said detector circuit;

(f) a first signal processing circuit connected to said low-pass filter circuit and adapted to be actuated in response to only the blue component of the output signal of said filter circuit;

(g) a signal detector for detecting an index signal;

(h) a second signal processing circuit connected to said second input terminal, said first input terminal and said signal detector circuit for generating a beam-index color signal;

(i) an adder circuit connected to said first and second signal processing circuits and said picture tube for adding the outputs of said first and second signal processing circuits and applying a bias current to said picture tube;

(j) a polarity reversing circuit connected to said second signal processing circuit for reversing the polarity of the output of said second signal processing circuit;

(k) an on-off switch connected to said first signal processing circuit and said polarity reversing circuit for passing the output of said polarity reversing circuit in response to the output of said first signal processing circuit; and (l) a clipping circuit connected to said first signal processing circuit, said adder circuit and said on-off switch for clipping the level of an output applied from said first signal processing circuit to said adder circuit, at a predetermined level of black side in response to only an output of said on-off switch in a manner to assure the required minimum bias current of said picture tube.

7. A beam-indexing color television receiver according to claim 6, wherein said first signal processing circuit comprises first, second, third and fourth transistors, a diode, an output signal amplifier and a switching circuit, said first transistor being turned on by a blanking pulse supplied to the base thereof, the collector potential thereof being set by a first resistor and a first variable resistor, an end of said first resistor being connected to a regulated voltage source and the other end thereof to the collector of said first transistor, an end of said first variable resistor being connected to said collector of said first transistor and the other end thereof grounded, the base of said second transistor being connected to the output of said switching circuit through the collector of said first transistor and a second variable resistor on the one hand and to the output of said on-off switch through a second resistor on the other hand, the base of said third transistor being connected to the collector of said second transistor, the emitter of said third transistor being grounded through a third resistor, the base of said fourth transistor being connected to the emitter of said third transistor, the collector of said fourth transistor being grounded, the emitter of said fourth transistor being connected to the cathode of said diode, the anode of said diode being connected to said adder circuit, said output signal amplifier amplifying the output of said low-pass filter circuit and supplying the resulting signal to said switching circuit and said second signal processing circuit, said on-off switch being actuated by the output of said switching circuit.

8. A beam-indexing color television receiver including a picture tube having a phosphor screen provided with one index stripe for every predetermined integral number of phosphor stripe sets, each of said sets including a red, a green and a blue phosphor stripe with said index stripe being disposed between two of the phosphor stripes in the sets for which it is provided, said color television receiver further comprising circuit means for supplying a bias current to said picture tube only upon detection of a chrominance signal within a predetermined hue range around a specific chrominance signal corresponding to the phosphor stripe other than the two between which said index stripe is disposed.

* * * * *